United States Patent
Eto et al.

(10) Patent No.: US 9,127,765 B2
(45) Date of Patent: Sep. 8, 2015

(54) VEHICLE DRIVE APPARATUS CONTROL APPARATUS

(75) Inventors: Shingo Eto, Gamagori (JP); Nobufusa Kobayashi, Anjo (JP); Yukihiko Ideshio, Nisshin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/351,254

(22) PCT Filed: Oct. 12, 2011

(86) PCT No.: PCT/JP2011/073447
§ 371 (c)(1),
(2), (4) Date: Apr. 11, 2014

(87) PCT Pub. No.: WO2013/054409
PCT Pub. Date: Apr. 18, 2013

(65) Prior Publication Data
US 2014/0244091 A1    Aug. 28, 2014

(51) Int. Cl.
*F16H 61/14*    (2006.01)
*B60K 6/48*    (2007.10)
*B60W 10/02*    (2006.01)
*B60W 20/00*    (2006.01)
(Continued)

(52) U.S. Cl.
CPC ............... *F16H 61/14* (2013.01); *B60K 6/48* (2013.01); *B60W 10/02* (2013.01); *B60W 20/00* (2013.01); *B60W 30/18063* (2013.01); *F16D 48/02* (2013.01); *B60Y 2300/429* (2013.01); *Y02T 10/6221* (2013.01); *Y02T 10/6295* (2013.01); *Y10S 903/946* (2013.01)

(58) Field of Classification Search
CPC .... F16H 61/14; B60Y 2300/429; B60K 6/48; B60W 10/02; B60W 20/00; B60W 30/18063; F16D 48/02; Y02T 10/6295; Y02T 10/6221; Y10S 903/946
USPC ........................................................ 701/22
See application file for complete search history.

(56) References Cited

U.S. PATENT DOCUMENTS

2004/0038774 A1 *   2/2004   Kuroda et al. ................... 477/3
2011/0098896 A1    4/2011   Kato et al.

FOREIGN PATENT DOCUMENTS

JP    02-147436    6/1990
JP    05-296338 B2    11/1993
(Continued)

*Primary Examiner* — Mary Cheung
*Assistant Examiner* — Yuen Wong
(74) *Attorney, Agent, or Firm* — Kenyon & Kenyon LLP

(57) ABSTRACT

A control device of a vehicle drive device includes a mechanical oil pump, a hydraulic power transmission device transmitting power of the engine and the electric motor to drive wheels via an interposed engagement device when it is engaged. While the electric motor drives the mechanical oil pump while an operation of the engine is stopped, the control device executing neutral control of putting the engagement device into a slip state or released state to suppress power transmission between the hydraulic power transmission device and the drive wheels, the hydraulic power transmission device including a lockup clutch mechanically coupling input and output members of the hydraulic power transmission device when engaged, the lockup clutch being engaged during executing of the neutral control. Also, after it is determined that the engine is likely to be restarted after a stop of operation while the vehicle remains stopped, the lockup clutch being released.

5 Claims, 4 Drawing Sheets

(51) Int. Cl.
*B60W 30/18* (2012.01)
*F16D 48/02* (2006.01)

(56) References Cited

FOREIGN PATENT DOCUMENTS

| | | | |
|---|---|---|---|
| JP | 2000-193082 A | 7/2000 |
| JP | 2000-320581 A | 11/2000 |
| JP | 2004-263732 A | 9/2004 |
| JP | 2006-151307 A | 6/2006 |
| JP | 2010-149652 A | 7/2010 |
| JP | 2010-149683 A | 7/2010 |
| JP | 2010-281398 A | 12/2010 |
| JP | 2011-094643 A | 5/2011 |

\* cited by examiner

VEHICLE DRIVE APPARATUS CONTROL APPARATUS

CROSS-REFERENCE TO RELATED APPLICATIONS

This is a national phase application based on the PCT International Patent Application No. PCT/JP2011/073447 filed on Oct. 12, 2011, the entire contents of which are incorporated herein by reference.

TECHNICAL FIELD

The present invention relates to control executed when a hybrid vehicle stops.

BACKGROUND ART

A hybrid vehicle is conventionally known that has an engine, an electric motor, and a mechanical oil pump coupled sequentially in series so as to run by power of at least one of the engine and the electric motor. For example, a control device of a vehicle drive device included in the hybrid vehicle is disclosed in Patent Document 1. The vehicle drive device of Patent Document 1 includes an electric oil pump. If an abnormality occurs in the electric oil pump, the control device of the vehicle drive device drives the mechanical oil pump by the electric motor to generate oil pressure.

PRIOR ART DOCUMENTS

Patent Documents

Patent Document 1: Japanese Laid-Open Patent Publication No. 2010-149652
Patent Document 2: Japanese Laid-Open Patent Publication No. 2010-281398

SUMMARY OF THE INVENTION

Problems to be Solved by the Invention

A hybrid vehicle stopping an operation of an engine at the time of vehicle stop requires supply of an oil pressure during vehicle stop so as to improve responsiveness of a transmission or the like at the restart of the vehicle. Therefore, it is contemplated that the hybrid vehicle is provided with an electric oil pump generating a sufficient oil pressure even during vehicle stop; however, the provision of the electric oil pump leads to a cost increase. Therefore, it is preferable for the hybrid vehicle to miniaturize the electric oil pump even if the electric oil pump is disposed, or to avoid disposing the electric oil pump, in terms of cost. In a configuration without the electric oil pump or a configuration disposed with only a small-sized electric oil pump, or if an abnormality occurs in the electric oil pump as in Patent Document 1 described above, the mechanical oil pump must be driven by the electric motor for acquiring a sufficient oil pressure during vehicle stop. However, in the case of a vehicle drive device having a hydraulic power transmission device such as a torque converter interposed between the electric motor and drive wheels due to a configuration of a power transmission path between the electric motor and the drive wheels, if the mechanical oil pump is driven by the electric motor during vehicle stop, a power loss due to differential rotation between input/output members of the hydraulic power transmission device (power loss of the hydraulic power transmission device) occurs even though the engine is stopped, which is an unknown problem. Such a power loss of the hydraulic power transmission device is considered to result in deterioration of fuel efficiency.

As disclosed in Patent Document 2, idling reduction control and neutral control are generally known as examples of control executed during vehicle stop. As described in Patent Document 2, if the engine is stopped due to the idling reduction control, the executing of the neutral control is inhibited. In other words, it has hitherto been common general technical knowledge that if the engine is stopped, the neutral control is not executed.

The present invention was conceived in view of the situations and it is therefore an object of the present invention to provide a control device of a vehicle drive device capable of suppressing deterioration in fuel efficiency by reducing the power loss of the hydraulic power transmission device during vehicle stop etc., in a hybrid vehicle having an engine and an electric motor.

Means for Solving the Problem

To achieve the object, the first aspect of the invention provides (a) a control device of a vehicle drive device comprising an engine and an electric motor acting as a drive force source for running, a mechanical oil pump driven by at least one of the engine and the electric motor, a hydraulic power transmission device transmitting power of the engine and the electric motor to drive wheels, and an engagement device interposed between the hydraulic power transmission device and the drive wheels, the engagement device transmitting power input from the hydraulic power transmission device to the drive wheels when engaged, wherein (b) if the electric motor drives the mechanical oil pump while an operation of the engine is stopped, the control device executes neutral control of putting the engagement device into a slip state or a released state to suppress power transmission between the hydraulic power transmission device and the drive wheels.

Effects of the Invention

Consequently, although the neutral control is executed only while the engine is operating in the conventional technique (see Patent Document 2), since the neutral control is executed while the engine is stopped i.e. the engine is not operating, the control device can reduce a power loss of the hydraulic power transmission device as compared to the case that an output member of the hydraulic power transmission device is bound to the drive wheels because of the engagement of the engagement device, for example, during vehicle stop etc. As a result, deterioration in fuel efficiency of the vehicle can be suppressed. Since a sufficient oil pressure can be acquired from the mechanical oil pump while the operation of the engine is stopped, for example, the electric oil pump can be eliminated or, even if the electric oil pump is included, the electric oil pump can be reduced in size. While the operation of the engine is stopped, an output shaft of the engine may be rotated for some reason. When the mechanical oil pump is driven by the electric motor, if the vehicle drive device is configured such that the engine cannot be separated from the electric motor or the mechanical oil pump, the engine may be dragged and rotated by rotation of the electric motor. The fuel efficiency refers to, for example, a running distance per unit fuel consumption etc., and improvement in fuel efficiency refers to extension of the running distance per unit fuel consumption, or a decrease in fuel consumption rate (=fuel consumption/drive wheel output). Contrarily, reduction (deterioration) in fuel efficiency refers to shortening of the running distance per unit fuel consumption or an increase in fuel consumption rate.

The second aspect of the invention provides the control device of a vehicle drive device recited in the first aspect of the invention, wherein (a) the hydraulic power transmission device includes a lockup clutch mechanically coupling input and output members of the hydraulic power transmission device when engaged, and wherein (b) the lockup clutch is engaged during executing of the neutral control. Consequently, the input and output members of the hydraulic power transmission device are mechanically coupled to and integrally rotated with each other due to the engagement of the lockup clutch and, thus, the power loss of the hydraulic power transmission device is suppressed as compared to the case of releasing the lockup clutch during executing of the neutral control. For example, if the lockup clutch is engaged during executing of the neutral control, the control device may perform a vehicle start with the engagement device slipped, while retaining the engaged state of the lockup clutch at the restart from the vehicle stop.

The third aspect of the invention provides the control device of a vehicle drive device recited in the first aspect of the invention, wherein (a) the hydraulic power transmission device includes a lockup clutch mechanically coupling input and output members of the hydraulic power transmission device when engaged, and wherein (b) the lockup clutch is released during executing of the neutral control. Consequently, when the engine is started during vehicle stop etc., the lockup clutch is preferably released so as to make it difficult to transmit a shock associated with the engine start to the drive wheels. However, since the lockup clutch is already released, the control device does not have to perform the release operation of the lockup clutch before the engine start. Therefore, a time required for the engine start can be reduced as compared to the case that the lockup clutch is engaged during executing of the neutral control.

The fourth aspect of the invention provides the control device of a vehicle drive device recited in the second aspect of the invention, wherein if warm-up of a power transmission device including the engagement device and the hydraulic power transmission device is promoted during executing of the neutral control, the lockup clutch is released. Consequently, the oil is stirred in the hydraulic power transmission device, resulting in a prompt rise in the oil temperature, and the warm-up of the power transmission device can promptly be completed. For example, one of the applications of the oil of the power transmission device is to be used as fluid for power transmission in the hydraulic power transmission device. The oil of the power transmission device may be used as operating oil or lubricating oil of the power transmission device.

The fifth aspect of the invention provides the control device of a vehicle drive device recited in the second or fourth aspect of the invention, wherein if it is determined that the engine is likely to be restarted after a stop of operation while the vehicle is kept stopped, the lockup clutch is released. Consequently, the control device can increase a frequency of a responsive start of the engine when the engine is started while the vehicle is kept stopped.

The sixth aspect of the invention provides the control device of a vehicle drive device recited in any one of the first to fifth aspects of the invention, wherein (a) an engine connecting/disconnecting clutch is disposed that selectively interrupts power transmission between the engine and the electric motor and that is released when engine operation is stopped, wherein (b) during executing of the neutral control, the engine connecting/disconnecting clutch is operated from a released state in an engagement direction to detect an operation amount of the engine connecting/disconnecting clutch when reduction in rotation speed occurs in the electric motor due to the operation of the engine connecting/disconnecting clutch. Consequently, the control device can obtain an operation amount when the engine connecting/disconnecting clutch starts having a torque capacity based on the reduction in the rotation speed of the electric motor. The operation amount of the engine connecting/disconnecting clutch starting to have a torque capacity can be utilized in the control of operating the engine connecting/disconnecting clutch. For example, the operation amount can be utilized for operating the engine connecting/disconnecting clutch with good responsiveness such that engagement shock is suppressed.

The seventh aspect of the invention provides the control device of a vehicle drive device recited in any one of the first to sixth aspects of the invention, wherein (a) a transmission is disposed that includes the engagement device and another engagement device to perform a shift between the hydraulic power transmission device and the drive wheels, wherein (b) during executing of the neutral control, the another engagement device is operated from a released state in an engagement direction to detect an operation amount of the another engagement device when reduction in rotation speed occurs in the electric motor due to the operation of the other engagement device. Consequently, the control device can obtain an operation amount when the other engagement device starts having a torque capacity based on the reduction in the rotation speed of the electric motor. The operation amount of the other engagement device starting to have a torque capacity can be utilized in the control of operating the other engagement device. For example, the operation amount can be utilized for a shift of the transmission involving an engagement or release of the other engagement device with good responsiveness and suppressed engagement shock.

The eighth aspect of the invention provides the control device of a vehicle drive device recited in any one of the first to seventh aspects of the invention, wherein if the mechanical oil pump is driven by the electric motor while an operation of the engine is stopped, a rotation speed of the mechanical oil pump is made lower as compared to during idling of the engine. Consequently, the control device can suppress an energy consumed for acquiring the oil pressure of the mechanical oil pump lower as compared to during operation of the engine. The electric motor has favorable controllability as compared to the engine even at low speed rotation and, therefore, the mechanical oil pump is driven at stable rotation speed.

Preferably, if the lockup clutch is released during executing of the neutral control, a relationship between an engagement oil pressure of the engagement device and an engagement force is learned based on the differential rotation generated between the input member and the output member of the hydraulic power transmission device.

Preferably, the case that warm-up of the power transmission device is promoted corresponds to the case that the oil temperature of the power transmission device is equal to or less than a predefined cold oil temperature determination value.

Preferably, it is determined whether the engine is likely to be restarted after a stop of operation while the vehicle is kept stopped, based on the charge remaining amount that is the basis of the electric power supplied to the electric motor or an inclination of the vehicle corresponding to the road surface gradient.

Preferably, while the mechanical oil pump is rotated by the electric motor, the rotation speed of the mechanical oil pump is lower than the rotation speed of idling of the engine. Therefore, since the differential rotation generated between the input member and the output member of the hydraulic power transmission device can be suppressed as compared to during idling of the engine while a necessary discharge amount of the mechanical oil pump is acquired, the fuel efficiency is improved.

MODE FOR CARRYING OUT THE INVENTION

An example of the present invention will now be described in detail with reference to the drawings.

EXAMPLE

Figure 1:
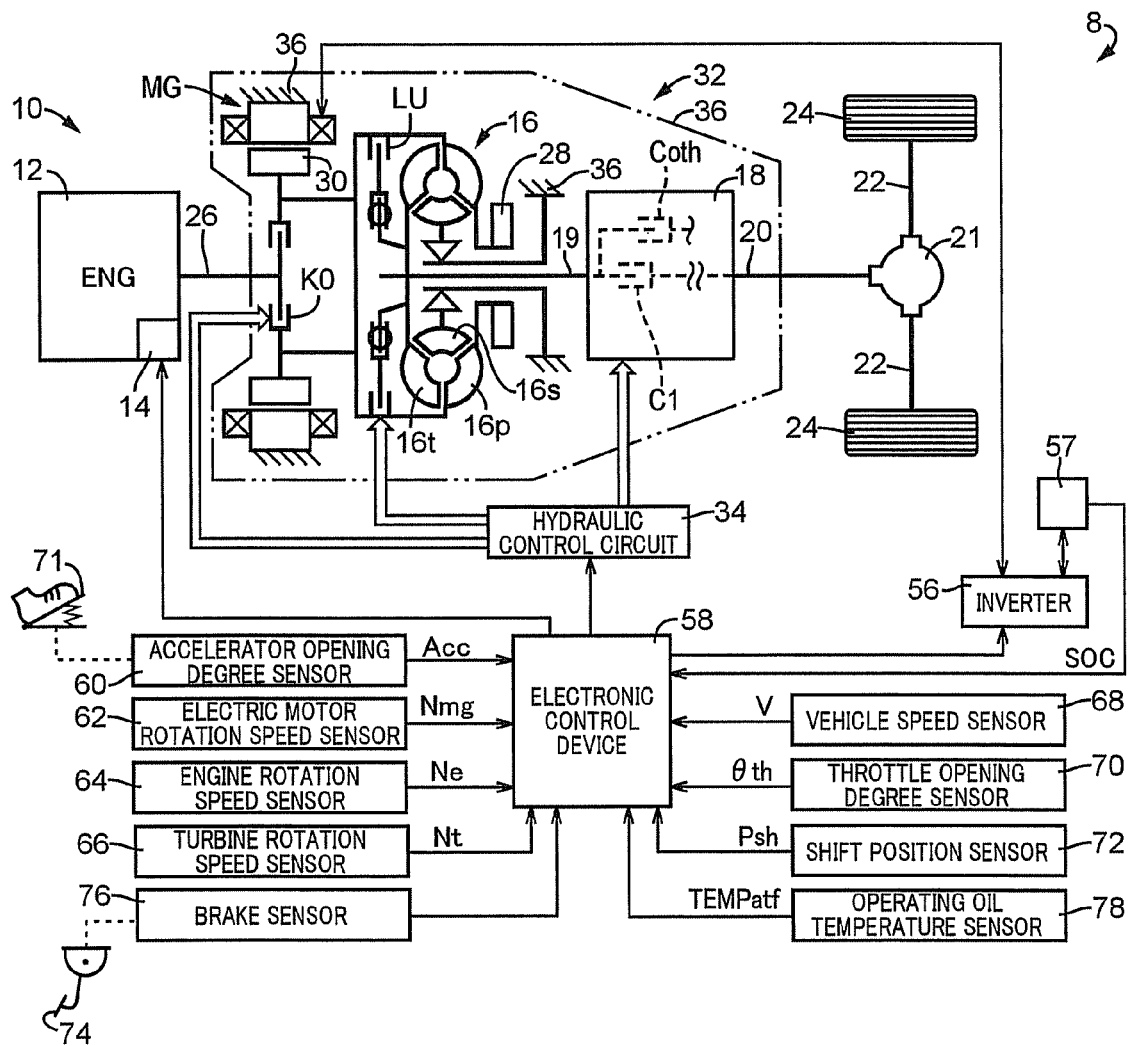
FIG. 1 is a conceptual diagram of a configuration of a drive system according to a hybrid vehicle that is an example of the present invention.

FIG. 1 is a conceptual diagram of a configuration of a drive system according to a hybrid vehicle 8 (hereinafter simple referred to as a "vehicle 8") that is an example of the present invention. The hybrid vehicle 8 depicted in FIG. 1 includes a vehicle drive device 10 (hereinafter referred to as a "drive device 10"), a differential gear device 21, a pair of left and right axles 22, a pair of left and right drive wheels 24, a hydraulic control circuit 34, an inverter 56, and an electronic control device 58. The drive device 10 includes an engine 12 such as a known gasoline engine and diesel engine acting as a drive force source for running, an engine output control device 14 starting or stopping the engine 12 and executing engine output control such as throttle control, an electric motor MG that is an electric motor for running acting as a drive force source for running, an engine connecting/disconnecting clutch K0, a torque converter 16, an automatic transmission 18, and a mechanical oil pump 28. In FIG. 1, specifically, the drive device 10 includes a power transmission path having the engine 12, the engine connecting/disconnecting clutch K0, the electric motor MG and the mechanical oil pump 28 coupled sequentially in series. The electric motor MG the engine connecting/disconnecting clutch K0, the torque converter 16, the automatic transmission 18, and the mechanical oil pump 28 make up a power transmission device 32 having a function of transmitting power of the engine 12 and are housed in a transmission case 36 that is a housing of the power transmission device 32. As depicted in FIG. 1, the vehicle 8 is configured such that power generated by one or both of the engine 12 and the electric motor MG is transmitted via each of the torque converter 16, the automatic transmission 18, the differential gear device 21, and the pair of the left and right axles 22 to the pair of the left and right drive wheels 24. Therefore, the vehicle 8 can select engine running using the power of the engine 12 for running and EV running (motor running) using only power of the electric motor MG for running with the engine 12 stopped, in an alternative manner while running. In the engine running, the electric motor MG may generate an assist torque depending on a running state.

The electric motor MG is coupled to a power transmission path from the engine 12 or the torque converter 16 to the drive wheels 24. In particular, a rotor 30 of the electric motor MG is relatively non-rotatably coupled to a pump impeller 16p that is an input member of the torque converter 16. The electric motor MG is a three-phase synchronous electric motor, for example, and is a motor generator having a function of a motor (mover) generating the power and a function of a generator (electric generator) generating a reaction force. For example, the electric motor MG performs regenerative operation to generate a vehicle braking force. The electric motor MG is electrically connected via the inverter 56 to an electric storage device 57, and the electric motor MG and the electric storage device 57 are configured such that electric power can mutually be given and received. The electric storage device 57 is, for example, a battery (secondary battery) such as a lead storage battery or a capacitor.

A power transmission path between the engine 12 and the electric motor MG is disposed with the engine connecting/disconnecting clutch K0 made up of a generally known wet multi-plate type hydraulic friction engagement device and the engine connecting/disconnecting clutch K0 is operated by an oil pressure supplied from the hydraulic control circuit 34 and acts as a power connecting/disconnecting device selectively interrupting power transmission between the engine 12 and the drive wheels 24. Specifically, an engine output shaft 26 (e.g., crankshaft) acting as an output member of the engine 12 is relatively non-rotatably coupled to the rotor 30 of the electric motor MG when the engine connecting/disconnecting clutch K0 is engaged and, is disconnected from the rotor 30 of the electric motor MG when the engine connecting/disconnecting clutch K0 is released. In short, the engine output shaft 26 is selectively coupled via the engine connecting/disconnecting clutch K0 to the rotor 30 of the electric motor MG. Therefore, the engine connecting/disconnecting clutch K0 is released during engine stop and is thus coupled during the engine running and released during the motor running.

The automatic transmission 18 makes up a portion of the power transmission path from the torque converter 16 to the drive wheels 24 and transmits the power of the engine 12 and the electric motor MG to the drive wheels 24. The automatic transmission 18 is a stepped automatic transmission performing a shift between the torque converter 16 and the drive wheels 24 in accordance with a preset relationship (shift diagram). In other words, the automatic transmission 18 is an automatic transmission mechanism having any of predefined multiple shift stages (gear ratios) achieved in an alternative manner and includes multiple planetary gear devices and multiple hydraulic friction engagement devices (brakes B or clutches C) actuated by the oil pressure from the hydraulic control circuit 34 so as to perform the shift. Each of the multiple hydraulic friction engagement devices is a clutch or a brake generally used in a stepped automatic transmission for a vehicle and is engaged to transmit power from the torque converter 16 to the drive wheels 24 in any of the shift stages of the automatic transmission 18. For example, the hydraulic friction engagement device includes a plurality of friction plates overlapped with each other and a hydraulic piston and is engaged when the hydraulic piston strokes to press the plurality of the friction plates. An operation amount of the hydraulic friction engagement device is, for example, a stroke amount of an axial movement of the hydraulic piston of the hydraulic friction engagement device from a released state. In the multiple hydraulic friction engagement devices, an engagement device engaged at a first speed, i.e., at the lowest vehicle speed shift stage of the automatic transmission 18, is engaged at the start of the vehicle 8 and therefore referred to as a starting engagement device C1 or a starting clutch C1. For example, during vehicle stop or during running at very low vehicle speed with the first speed established, a turbine impeller 16*t*, i.e., a transmission input shaft 19 coupled thereto, is bound to the drive wheels 24 by engaging the starting clutch C1, and is separated from the drive wheels 24 by releasing the starting clutch C1. The starting clutch C1 corresponds to an engagement device (rather than another engagement device) of the present invention.

The torque converter 16 is a hydraulic power transmission device interposed between the electric motor MG and the automatic transmission 18 to transmit the power of the engine 12 and the electric motor MG to the drive wheels 24. The torque converter 16 includes the pump impeller 16*p* acting as an input member of the torque converter 16, the turbine impeller 16*t* acting as an output member of the torque converter 16, and a stator impeller 16*s*. The torque converter 16 transmits power input to the pump impeller 16*p* via fluid (operating oil) to the turbine impeller 16*t*. The stator impeller 16*s* is coupled via a unidirectional clutch to the transmission case 36 that is a non-rotating member. The fluid transmitting the power between the pump impeller 16*p* and the turbine impeller 16*t* in the torque converter 16 is in common with operating oil of the power transmission device 32, i.e., operating oil of the automatic transmission 18, and is oil having an oil pressure applied by the mechanical oil pump 28. For example, the operating oil is used for applications such as lubrication of the portions in the power transmission device 32, actuation of the clutches etc., of the automatic transmission 18, and cooling of the electric motor MG.

The torque converter 16 includes between the pump impeller 16*p* and the turbine impeller 16*t* a lockup clutch LU selectively directly coupling the pump impeller 16*p* and the turbine impeller 16*t* to each other. The lockup clutch LU is an engagement device controlled by the oil pressure from the hydraulic control circuit 34, and the pump impeller 16*p* and the turbine impeller 16*t* are mechanically coupled when the lockup clutch LU is engaged.

The mechanical oil pump 28 is coupled to integrally rotate with the pump impeller 16*p* of the torque converter 16 and the rotor 30 of the electric motor MG and generates an oil pressure in accordance with rotation of the pump impeller 16*p*. The oil pressure of the mechanical oil pump 28 is supplied as an original pressure to the hydraulic control circuit 34. As apparent from the configuration of FIG. 1, the mechanical oil pump 28 is driven by at least one of the engine 12 and the electric motor MG.

For example, during transition from the motor running to the engine running in the vehicle 8, an engine rotation speed Ne is raised by engagement of the engine connecting/disconnecting clutch K0 to start the engine 12. For example, the engine rotation speed Ne is raised for the engine start by drive force of the electric motor MG or a reverse drive force transmitted from the drive wheels 24 during vehicle running.

The vehicle 8 has a control system as exemplarily illustrated in FIG. 1. The electronic control device 58 depicted in FIG. 1 has a function as a control device controlling the vehicle drive device 10 and includes a so-called microcomputer. As depicted in FIG. 1, the electronic control device 58 is supplied with various input signals detected by sensors disposed in the hybrid vehicle 8. For example, the electronic control device 58 receives input of a signal indicative of an accelerator opening degree Acc that is a depression amount of an accelerator pedal 71 detected by an accelerator opening degree sensor 60, a signal indicative of a rotation speed (electric motor rotation speed) Nmg of the electric motor MG detected by an electric motor rotation speed sensor 62, a signal indicative of the rotation speed (engine rotation speed) Ne of the engine 12 detected by an engine rotation speed sensor 64, a signal indicative of a rotation speed (turbine rotation speed) Nt of the turbine impeller 16*t* of the torque converter 16 detected by a turbine rotation speed sensor 66, a signal indicative of a vehicle speed V detected by a vehicle speed sensor 68, a signal indicative of a throttle opening degree θth of the engine 12 detected by a throttle opening degree sensor 70, a signal indicative of a charge remaining amount (state of charge) SOC of the electric storage device 57 acquired from the electric storage device 57, a signal indicative of a shift position Psh of a shift operation device operated by a driver from a shift position sensor 72, a signal indicative of an amount of depression of a brake pedal 74 by a driver from a brake sensor 76, a signal indicative of a temperature TEMPatf of the operating oil (operating oil temperature TEMPatf) of the power transmission device 32 from an operating oil temperature sensor 78, etc. The electric motor rotation speed Nmg detected by the electric motor rotation speed sensor 62 is an input rotation speed of the torque converter 16 and is the same as a rotation speed (pump rotation speed) Np of the pump impeller 16*p* in the torque converter 16. The turbine rotation speed Nt detected by the turbine rotation speed sensor 66 is an output rotation speed of the torque converter 16 and is the same as a rotation speed Natin, i.e., a transmission input rotation speed Natin, of the transmission input shaft 19 in the automatic transmission 18. A rotation speed Natout, i.e., a transmission output rotation speed Natout, of an output shaft 20 (hereinafter referred to as a transmission output shaft 20) of the automatic transmission 18 is an output rotation speed Nout of the vehicle drive device 10 and corresponds to the vehicle speed V.

Various output signals are supplied from the electronic control device 58 to the devices disposed on the vehicle 8.

Although the engine 12 can control the rotation speed Ne to some extent when the speed is equal to or greater than an idle rotation speed (also referred to as an idling rotation speed) enabling self-sustaining rotation, the engine 12 cannot control the rotation speed Ne less than the idle rotation speed. Therefore, to reduce a differential rotation DNpt (=Np−Nt) generated between the pump impeller 16*p* and the turbine impeller 16*t* of the torque converter 16 for achieving an improvement in fuel efficiency during idling of the engine 12 in an engaged state of the engine connecting/disconnecting clutch K0, so-called neutral control must be executed. On the other hand, the electric motor MG can control the rotation speed Nmg equal to or higher or lower than the idle rotation speed of the engine 12. Therefore, the electric motor MG does not need to be continuously rotated near the idle rotation speed as in the case of the engine 12. Thus, even if it becomes necessary to rotate the electric motor MG for the purpose of driving the mechanical oil pump 28 etc., the electric motor MG may be rotated such that the differential rotation DNpt of the torque converter 16 is reduced so as to achieve an improvement in fuel efficiency. However, when it is attempted to rotate the mechanical oil pump 28 by the electric motor MG, a width enabling control of the electric motor rotation speed Nmg is limited, even in the electric motor MG with the rotation speed Nmg easily controlled, so as to ensure a discharge amount of the mechanical oil pump 28. Therefore, the differential rotation DNpt of the torque converter 16 is expanded, which is a problem that is not pointed out in a conventional case. A main portion of a control function for solving this problem will hereinafter be described with reference to FIG. 2.

Figure 2:
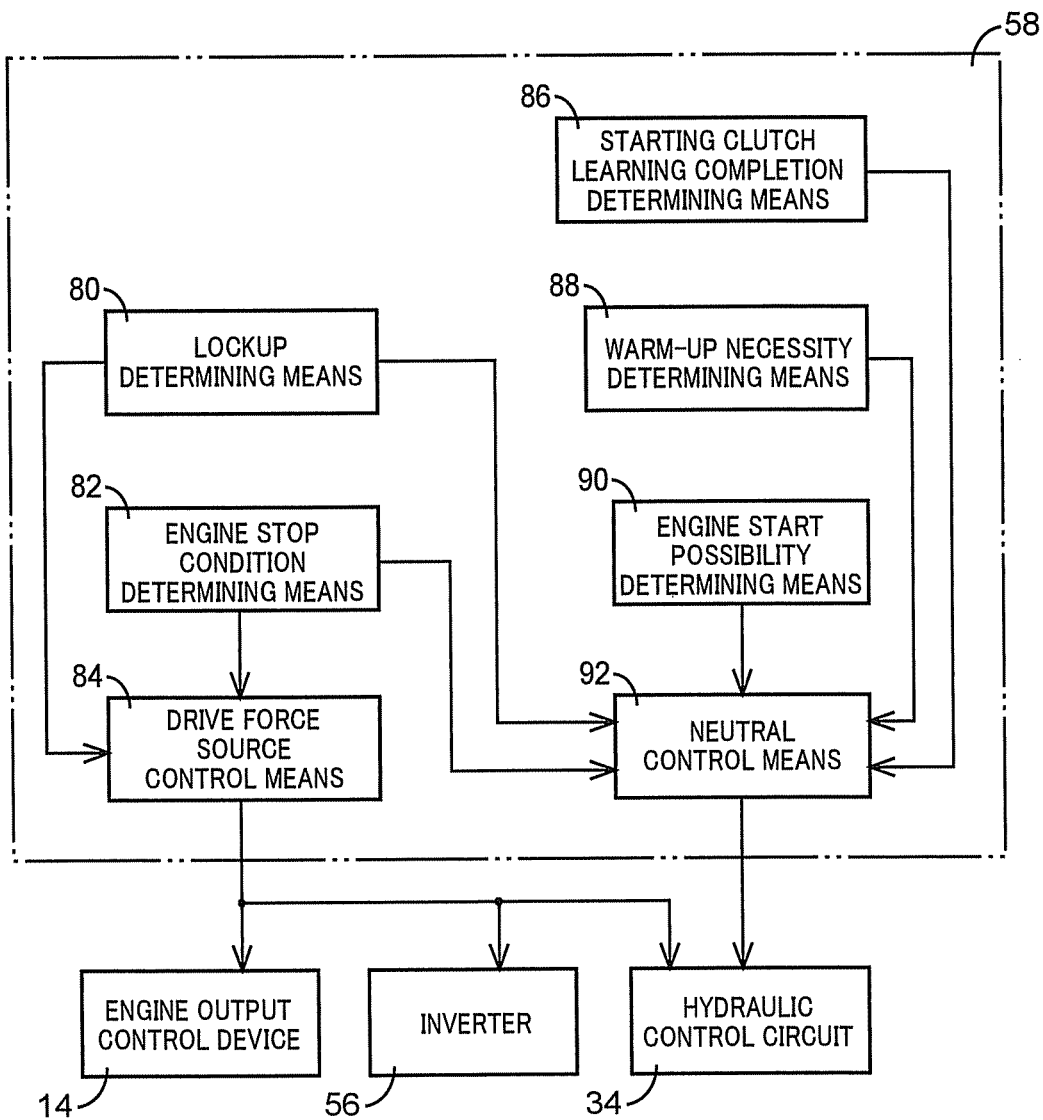
FIG. 2 is a functional block diagram for explaining a main portion of the control function included in the electronic control device of FIG. 1.

FIG. 2 is a functional block diagram for explaining a main portion of the control function included in the electronic control device 58. As depicted in FIG. 2, the electronic control device 58 functionally includes a lockup determining means 80 as a lockup determining portion, an engine stop condition determining means 82 as an engine stop condition determining portion, a drive force source control means 84 as a drive force source control portion, a starting clutch learning completion determining means 86 as a starting clutch learning completion determining portion, a warm-up necessity determining means 88 as a warm-up necessity determining portion, an engine start possibility determining means 90 as an engine start possibility determining portion, and a neutral control means 92 as a neutral control portion.

The lockup determining means 80 sequentially determines whether the lockup clutch LU is engaged, i.e., whether the lockup clutch LU is lockup-on. For example, whether lockup-on or not can be determined from a control signal to an electromagnetic valve controlling actuation of the lockup clutch LU.

The engine stop condition determining means 82 sequentially determines whether a predefined engine stop condition is satisfied that is a condition for determining whether the engine 12 is temporarily automatically stopped in relation to a stop of running of the vehicle 8 or, in other words, sequentially determines whether an idling reduction executing condition is satisfied that is a condition for executing idling reduction control described later. For example, the idling reduction executing condition is made up of conditions that (i) ignition is turned on; (ii) the vehicle speed V detected by the vehicle speed sensor 68 is zero or equal to or less than a predetermined vehicle speed that can be considered as substantially zero; (iii) the brake pedal 74 is being depressed (operated), i.e., brake-on; and (iv) the accelerator opening degree Acc is zero, and is satisfied when these individual conditions (i) to (iv) are all met. On the other hand, the idling reduction executing condition is not satisfied if any one of the individual conditions (i) to (iv) is not met. For example, when the idling reduction executing condition is satisfied, if the brake-on is changed to brake-off indicative of release of the brake pedal 74, i.e., if braking operation of the vehicle 8 is canceled, the condition (iii) is not met and, therefore, the idling reduction executing condition being satisfied is no longer satisfied. The conditions (i) to (iv) are an example of the idling reduction executing condition and may be replaced with another condition or may have an additional condition. Any of the conditions (i) to (iv) may not be included in the idling reduction executing condition.

If the engine stop condition determining means 82 determines that the idling reduction executing condition is satisfied, specifically, if the idling reduction executing condition being unsatisfied is satisfied, the drive force source control means 84 executes the idling reduction control in which the engine 12 is temporarily automatically stopped in relation to a stop of running of the vehicle 8. The drive force source control means 84 releases the engine connecting/disconnecting clutch K0 at the same time and drives the mechanical oil pump 28 by the electric motor MG. This is for the purpose of ensuring acquisition of the original pressure of the hydraulic control circuit 34 even while the engine 12 is stopped. Strictly speaking, a stop of the engine 12 in the idling reduction control means stopping an operation of the engine 12 and the engine output shaft 26 may be rotated. Since the electric motor rotation speed Nmg can easily be made lower than the idle rotation speed of the engine 12 during the drive of the mechanical oil pump 28 and, because of a reason that power consumption of the electric motor MG is suppressed, the drive force source control means 84 makes a rotation speed Nmop of the mechanical oil pump 28 lower as compared to during idling of the engine 12 if the operation of the engine 12 is stopped and the mechanical oil pump 28 is driven by the electric motor MG. In other words, the rotation speed Nmop of the mechanical oil pump 28 driven by the electric motor MG during the idling reduction control is made lower as compared to during idling of the engine 12. For example, the rotation speed Nmop of the mechanical oil pump 28 during the idling reduction control is reduced to about a half of the rotation speed Nmop during the idling. The engine 12 is put into a non-operating state due to the idling reduction control and, when the engine connecting/disconnecting clutch K0 is released in the non-operating state of the engine 12, the engine 12 stops in terms of rotation as well as an operation.

On the other hand, after the idling reduction executing condition is satisfied, if the engine stop condition determining means 82 determines that the idling reduction executing condition is no longer satisfied, the drive force source control means 84 terminates the idling reduction control. However, even if the idling reduction control is terminated, the engine 12 is not necessarily immediately started. For example, if the vehicle 8 is started in the motor running, a stopped state of the engine 12 continues and the engine 12 is started when the motor running is switched to the engine running. The engine 12 is started by engaging the engine connecting/disconnecting clutch K0 and cranking the engine 12 by the electric motor MG. The drive force source control means 84 may not depend only on the determination of the engine stop condition determining means 82 and, for example, if the lockup determining means 80 determines that the lockup clutch LU is not lockup-on before the start of the idling reduction control, the drive force source control means 84 may not start the idling reduction control regardless of the determination of the engine stop condition determining means 82.

The starting clutch learning completion determining means 86 sequentially determines whether engagement force learning of the starting clutch C1 included in the automatic transmission 18 is completed. The engagement force learning is learning control executed by the neutral control means 92 as described later. Specifically, the starting clutch learning completion determining means 86 determines that the engagement force learning is not completed if an engagement force learning flag FLG1 switched by the neutral control means 92 is zero, and determines that the engagement force learning is completed if the engagement force learning flag FLG1 is one.

The warm-up necessity determining means 88 sequentially determines whether warm-up of the power transmission device 32 needs to be promoted. Specifically, the warm-up necessity determining means 88 sequentially detects the operating oil temperature TEMPatf of the power transmission device 32 with the operating oil temperature sensor 78 and determines that the warm-up of the power transmission device 32 needs to be promoted if the operating oil temperature TEMPatf is equal to or less than a predefined cold oil temperature determination value TEMPc. The cold oil temperature determination value TEMPc is empirically set in advance to a temperature at which the warm-up of the power transmission device 32 should be promoted in terms of improvement in fuel efficiency if the detected operating oil temperature TEMPatf is equal to or less than the determination value TEMPc. In short, the cold oil temperature determination value TEMPc is a threshold value for determining that the power transmission device 32 is in a cold time when the operating oil temperature TEMPatf is equal to or less than the threshold value.

The engine start possibility determining means 90 sequentially determines whether the engine 12 is likely to be restarted after a stop of operation while the vehicle is kept stopped after vehicle stop. For example, when the vehicle is stopped and the idling reduction control is executed, the engine 12 is stopped; however, if the charge remaining amount SOC of the electric storage device 57 is not sufficient or if the stopped vehicle 8 is located on a road surface with a steep gradient, the engine 12 may be restarted while the vehicle is kept stopped regardless of the idling reduction control. Therefore, the engine start possibility determining means 90 determines whether the engine 12 is likely to be restarted after a stop of operation while the vehicle is kept stopped, based on the charge remaining amount SOC that is the basis of the electric power supplied to the electric motor MG or an inclination of the vehicle 8 corresponding to the road surface gradient detected by a gradient sensor. Specifically, if the charge remaining amount SOC is equal to or less than a predetermined charge remaining amount reduction determination value or if the inclination of the vehicle 8 corresponding to the road surface gradient relative to horizontality is equal to or greater than a predetermined gradient determination value, it is determined that the engine 12 is likely to be restarted after a stop of operation while the vehicle is kept stopped. On the other hand, if the charge remaining amount SOC is greater than the charge remaining amount reduction determination value and the inclination of the vehicle 8 is less than the gradient determination value, it is determined that the engine 12 is not likely to be restarted after a stop of operation while the vehicle is kept stopped. For example, the charge remaining amount reduction determination value is a determination value empirically defined in advance for determining whether the charge remaining amount SOC is insufficient. The gradient determination value is a preliminarily empirically defined determination value for determining whether the engine 12 should be started in advance for preventing the vehicle 8 from temporarily moving backward due to the road surface gradient at the start of the vehicle.

If the operation of the engine 12 is stopped and the mechanical oil pump 28 is driven by the electric motor MG when the vehicle stops, the neutral control means 92 executes so-called neutral control of putting the starting clutch C1 into a slip state to suppress power transmission between the torque converter 16 and the drive wheels 24. As described above, if the idling reduction executing condition is satisfied, the drive force source control means 84 stops the operation of the engine 12 and drives the mechanical oil pump 28 by the electric motor MG when the vehicle stops. Therefore, if the operation of the engine 12 is stopped and the mechanical oil pump 28 is driven by the electric motor MG when the vehicle stops, this specifically means that the idling reduction executing condition is satisfied. In short, if the engine stop condition determining means 82 determines that the idling reduction executing condition is satisfied, the neutral control means 92 executes the neutral control. If the engine stop condition determining means 82 determines that the idling reduction executing condition is no longer satisfied after the start of the neutral control, for example, if the depression of the brake pedal 74 is cancelled, the neutral control means 92 terminates the neutral control. For example, the neutral control is terminated to engage the starting clutch C1 and establish the first speed of the automatic transmission 18. The neutral control is abbreviated as "N-control". The neutral control means 92 may not depend only on the determination of the engine stop condition determining means 82 and, for example, if the lockup determining means 80 determines that the lockup clutch LU is not lockup-on before start of the neutral control, the neutral control means 92 may not start the neutral control regardless of the determination of the engine stop condition determining means 82.

Describing the neutral control executed by the neutral control means 92 in detail, the neutral control includes two types, which are lockup neutral control that is the neutral control executed while the lockup clutch LU is engaged (abbreviated as lockup N-control) and lockup-off neutral control that is the neutral control executed while the lockup clutch LU is released (abbreviated as lockup-off N-control). When executing the neutral control, the neutral control means 92 considers the determination of the engine stop condition determining means 82, as well as the respective determinations of the starting clutch learning completion determining means 86, the warm-up necessity determining means 88, and the engine start possibility determining means 90, to select either the lockup N-control or the lockup-off N-control.

Specifically, if the starting clutch learning completion determining means 86 determines that the engagement force learning of the starting clutch C1 is not completed, if the warm-up necessity determining means 88 determines that the warm-up of the power transmission device 32 needs to be promoted, or if the engine start possibility determining means 90 determines that the engine 12 is likely to be restarted after a stop of operation while the vehicle is kept stopped, the neutral control means 92 executes the lockup-off N-control. In other words, the N-control is executed and, while the N-control is executed, the lockup clutch LU is released.

On the other hand, if the starting clutch learning completion determining means 86 determines that the engagement force learning of the starting clutch C1 is completed, if the warm-up necessity determining means 88 determines that the warm-up of the power transmission device 32 does not need to be promoted, and if the engine start possibility determining means 90 determines that the engine 12 is not likely to be restarted after a stop of operation while the vehicle is kept stopped, the neutral control means 92 executes the lockup N-control. In other words, the N-control is executed and, while the N-control is executed, the lockup clutch LU is engaged.

The neutral control means 92 has a function as an engagement force learning means performing the engagement force learning of the starting clutch C1. The engagement force learning of the starting clutch C1 is performed if the lockup clutch LU is released during executing of the N-control, i.e., if the lockup-off N-control is being executed. Specifically, in the engagement force learning of the starting clutch C1, the neutral control means 92 learns a relationship between an engagement oil pressure PC1 (e.g., in kPa) of the starting clutch C1 and an engagement force, i.e., torque capacity, of the starting clutch C1 based on the differential rotation DNpt (=Np−Nt) generated between the pump impeller 16p and the turbine impeller 16t of the torque converter 16. For example, since the lockup clutch LU is in a released state when the engagement force learning is performed, if the engagement oil pressure PC1 is gradually increased from a released state of the starting clutch C1, the engagement force of the starting clutch C1 accordingly gradually increases and the differential rotation DNpt of the torque converter 16 expands. In the engagement force learning, the neutral control means 92 sequentially detects the differential rotation DNpt of the torque converter 16 and obtains the relationship between the engagement oil pressure PC1 and the engagement force of the starting clutch C1 from the relationship between the differential rotation DNpt and the engagement oil pressure PC1 of the starting clutch C1 When the relationship between the differential rotation DNpt of the torque converter 16 and the engagement oil pressure PC1 of the starting clutch C1 is acquired, the engagement oil pressure PC1 is preferably gradually increased from the released state of the starting clutch C1 while a torque Tmg of the electric motor MG (hereinafter referred to as an electric motor torque Tmg) is retained at a predetermined constant value. In the engagement force learning, preferably, the operating oil temperature TEMPatf of the power transmission device 32 is also considered. If the relationship between the engagement oil pressure PC1 and the engagement force of the starting clutch C1 is completely obtained, i.e., if the engagement force learning is completed, the neutral control means 92 switches the engagement force learning flag FLG1 having an initial value of zero to one. Therefore, the engagement force learning flag FLG1 of zero indicates that the engagement force learning is not completed, and the engagement force learning flag FLG1 of one indicates that the engagement force learning is completed. The engagement oil pressure PC1 of the starting clutch C1 learned in the engagement force learning may be an actual engagement oil pressure detected by an oil pressure sensor etc., or may be a command value of the engagement oil pressure, i.e., an engagement instruction oil pressure.

Based on the learning result (relationship between the engagement oil pressure PC1 and the engagement force of the starting clutch C1) acquired through the engagement force learning as described above, the neutral control means 92 determines the engagement oil pressure PC1 during executing of the N-control such that the starting clutch C1 during executing of the N-control is put into a predetermined target slip state, for example, a predetermined target slip state in which a power loss due to a slip of the starting clutch C1 is suppressed lower while higher responsiveness is acquired at the time of an engagement operation. If the N-control executed by the neutral control means 92 is the lockup-off N-control, the lockup clutch LU is in the released state and, therefore, even if the engagement force learning is not completed, the differential rotation DNpt of the torque converter 16 can sequentially be detected to realize the predetermined target slip state based on the differential rotation DNpt. If the lockup-off N-control is executed because the engagement force learning is not completed, the neutral control means 92 preferably switches the N-control being executed from the lockup-off N-control to the lockup N-control, i.e., engages the lockup clutch LU while maintaining the executing of the N-control, after the completion of the engagement force learning.

Although the neutral control means 92 includes the control functions as described above, another control function may be included. For example, since the engine connecting/disconnecting clutch K0 is released during executing of both the lockup-off N-control and the lockup N-control, the neutral control means 92 may act as an engagement device operation amount detecting means to detect an operation amount from the released state of the engine connecting/disconnecting clutch K0 until an engagement force begins to be generated as a mechanical clearance decreases, i.e., an initial operation amount, during executing of the N-control (the lockup-off N-control or the lockup N-control). For example, to detect the initial operation amount of the engine connecting/disconnecting clutch K0 during executing of the N-control, the neutral control means 92 gradually operates the engine connecting/disconnecting clutch K0 from the released state in an engagement direction and sequentially detects the electric motor rotation speed Nmg at the same time. The neutral control means 92 detects the operation amount of the engine connecting/disconnecting clutch K0 as the initial operation amount when reduction in the rotation speed occurs in the electric motor MG due to the operation of the engine connecting/disconnecting clutch K0. Although the detection of the initial operation amount of the engine connecting/disconnecting clutch K0 may be performed during executing of the lockup-off N-control or during executing of the lockup N-control, the detection is preferably performed during executing of the lockup N-control. When the initial operation amount of the engine connecting/disconnecting clutch K0 is detected, the engine connecting/disconnecting clutch K0 is preferably gradually operated from the released state in the engagement direction while the electric motor torque Tmg is retained at a predetermined constant value.

Alternatively, for another engagement device Coth other than the starting clutch C1 in the plurality of the hydraulic friction engagement devices included in the automatic transmission 18, the neutral control means 92 acting as the engagement device operation amount detecting means may detect an operation amount from a released state of the other engagement device Coth until an engagement force begins to be generated as a mechanical clearance decreases, i.e., an initial operation amount, during executing of the N-control. The other engagement device Coth is an engagement device included in the automatic transmission 18 except the starting clutch C1 and increases a rotation load of the turbine impeller 16t when engaged. For example, to detect the initial operation amount of the other engagement device Coth during executing of the N-control, the neutral control means 92 gradually operates the other engagement device Coth from the released state in the engagement direction and sequentially detects the electric motor rotation speed Nmg at the same time. The neutral control means 92 detects the operation amount of the other engagement device Coth as the initial operation amount when the reduction in the rotation speed occurs in the electric motor MG due to the operation of the other engagement device Coth. Although the detection of the initial operation amount of the other engagement device Coth may be performed during executing of the lockup-off N-control or during executing of the lockup N-control, the detection is preferably performed during executing of the lockup N-control. When the initial operation amount of the other engagement device Coth is detected, the other engagement device Coth is preferably gradually operated from the released state in the engagement direction while the electric motor torque Tmg is retained at a predetermined constant value.

Figure 3:
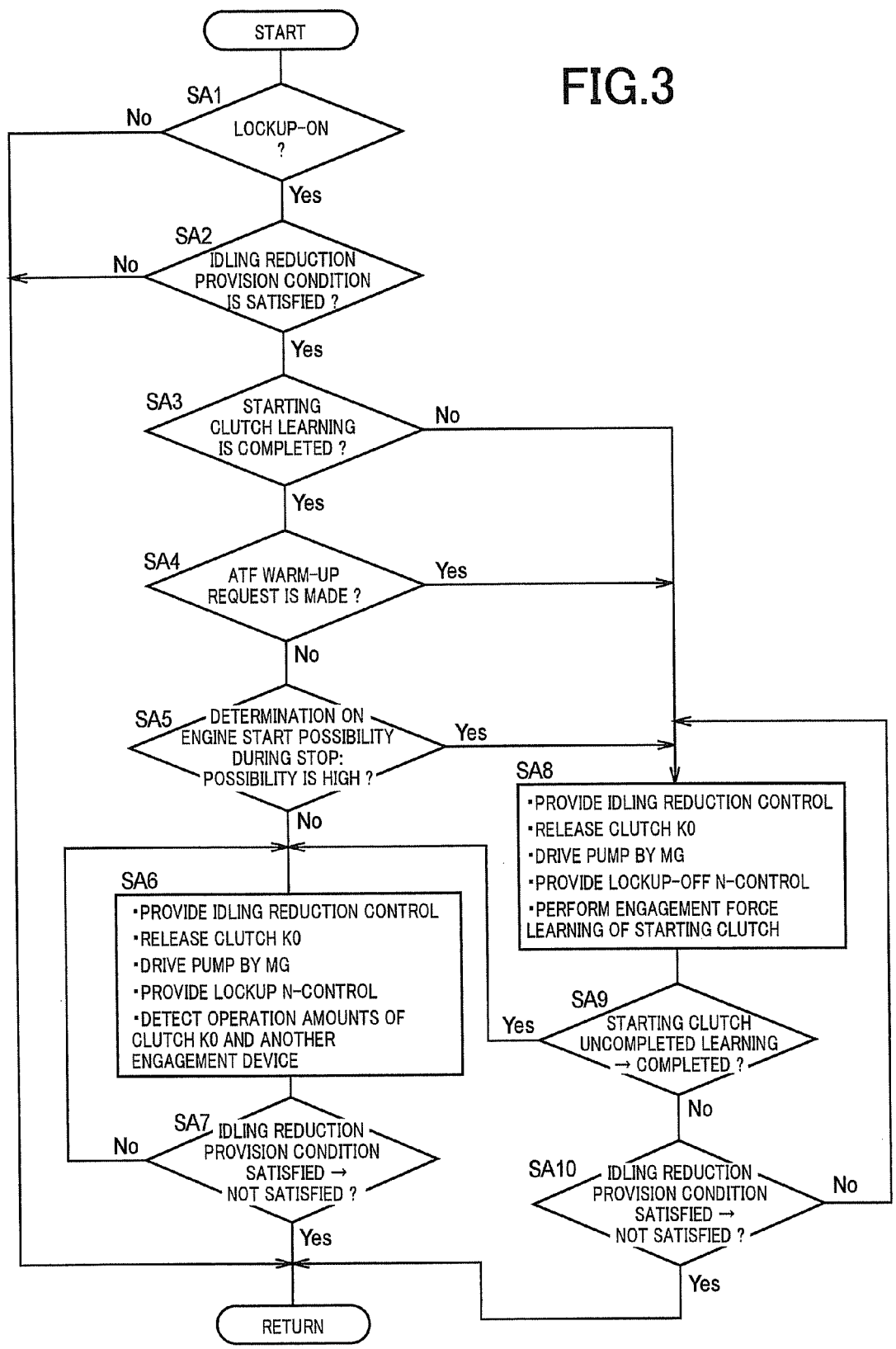
FIG. 3 is a flowchart for explaining a main portion of an control operation of the electronic control device in FIG. 1, i.e., the control operation of executing the neutral control in the engine non-operating state during vehicle stop.

FIG. 3 is a flowchart for explaining a main portion of a control operation of the electronic control device 58, i.e., a control operation of executing the N-control in the engine non-operating state during vehicle stop, and is repeatedly executed with an extremely short cycle time, for example, on the order of a few msec to a few tens of msec. The control operation depicted in FIG. 3 is performed if ignition is turned on in the vehicle 8. The control operation depicted in FIG. 3 is performed solely or concurrently with another control operation.

First, at step (hereinafter, "step" will be omitted) SA1 of FIG. 3, it is determined whether the lockup clutch LU is lockup-on. If the determination of SA1 is affirmative, i.e., if the lockup clutch LU is lockup-on, the operation goes to SA2. On the other hand, if the determination of SA1 is negative, this flowchart is terminated. SA1 corresponds to the lockup determining means 80.

At SA2 corresponding to the engine stop condition determining means 82, it is determined whether the idling reduction executing condition is satisfied. If the determination of SA2 is affirmative, i.e., if the idling reduction executing condition is satisfied, the operation goes to SA3. On the other hand, if the determination of SA2 is negative, this flowchart is terminated.

At SA3 corresponding to the starting clutch learning completion determining means 86, it is determined whether the engagement force learning of the starting clutch C1 is completed. If the determination of SA3 is affirmative, i.e., if the engagement force learning is completed, the operation goes to SA4. On the other hand, if the determination of SA3 is negative, i.e., if the engagement force learning is not completed, the operation goes to SA8.

At SA4 corresponding to the warm-up necessity determining means 88, it is determined whether the warm-up of the power transmission device 32 needs to be promoted. For example, when the warm-up of the power transmission device 32 needs to be promoted, this indicates a presence of an ATF warm-up request that is a request for warming up the operating oil (ATF) of the power transmission device 32. If the determination of SA4 is affirmative, i.e., if the warm-up of the power transmission device 32 needs to be promoted, the operation goes to SA8. On the other hand, if the determination of SA4 is negative, i.e., the operation goes to SA5.

At SA5 corresponding to the engine start possibility determining means 90, it is determined whether the engine 12 is likely to be restarted after a stop of operation while the vehicle is kept stopped after vehicle stop. In other words, the possibility of engine start during vehicle stop is determined. If the determination of SA5 is affirmative, i.e., if the engine 12 is likely to be restarted after a stop of operation while the vehicle is kept stopped after vehicle stop, the operation goes to SA8. On the other hand, if the determination of SA5 is negative, the operation goes to SA6.

At SA6 corresponding to the drive force source control means 84 and the neutral control means 92, the idling reduction control is executed and the engine connecting/disconnecting clutch K0 is released while the mechanical oil pump 28 is driven by the electric motor MG. The lockup N-control is executed at the same time. At SA6, if the initial operation amount of the engine connecting/disconnecting clutch K0 is not yet detected, the initial operation amount of the engine connecting/disconnecting clutch K0 is detected during executing of the lockup N-control. If the initial operation amount of the other engagement device Coth is not yet detected, the initial operation amount of the other engagement device Coth is detected during executing of the lockup N-control. SA6 is followed by SA7.

At SA7 corresponding to the engine stop condition determining means 82, it is determined whether the idling reduction executing condition being satisfied is no longer satisfied. For example, if an operation state of the brake pedal 74 is switched from the brake-on to the brake off, the idling reduction executing condition being satisfied is no longer satisfied. If the determination of SA7 is affirmative, i.e., if the idling reduction executing condition being satisfied is no longer satisfied, this flowchart is terminated. On the other hand, if the determination of SA7 is negative, the operation returns to SA6. In short, SA6 is continuously executed until the determination of SA7 becomes affirmative.

At SA8 corresponding to the drive force source control means 84 and the neutral control means 92, the idling reduction control is executed and the engine connecting/disconnecting clutch K0 is released while the mechanical oil pump 28 is driven by the electric motor MG. The lockup-off N-control is executed at the same time. At SA8, if the engagement force learning of the starting clutch C1 is not completed, the engagement force learning of the starting clutch C1 is performed during executing of the lockup-off N-control. SA8 is followed by SA9.

At SA9 corresponding to the neutral control means 92, it is determined whether the uncompleted engagement force learning of the starting clutch C1 performed at SA8 is completed. If the determination at SA9 is affirmative, i.e., if the uncompleted engagement force learning of the starting clutch C1 is completed, the operation goes to SA6. On the other hand, if the determination at SA9 is negative, the operation goes to SA10.

At SA10 corresponding to the engine stop condition determining means 82, it is determined whether the idling reduction executing condition being satisfied is no longer satisfied, as is the case with SA7. If the determination of SA10 is affirmative, i.e., if the idling reduction executing condition being satisfied is no longer satisfied, this flowchart is terminated. On the other hand, if the determination of SA10 is negative, the operation returns to SA8. In short, SA8 is continuously executed until the determination of SA10 becomes affirmative or until the determination of SA9 becomes affirmative.

Figure 4:
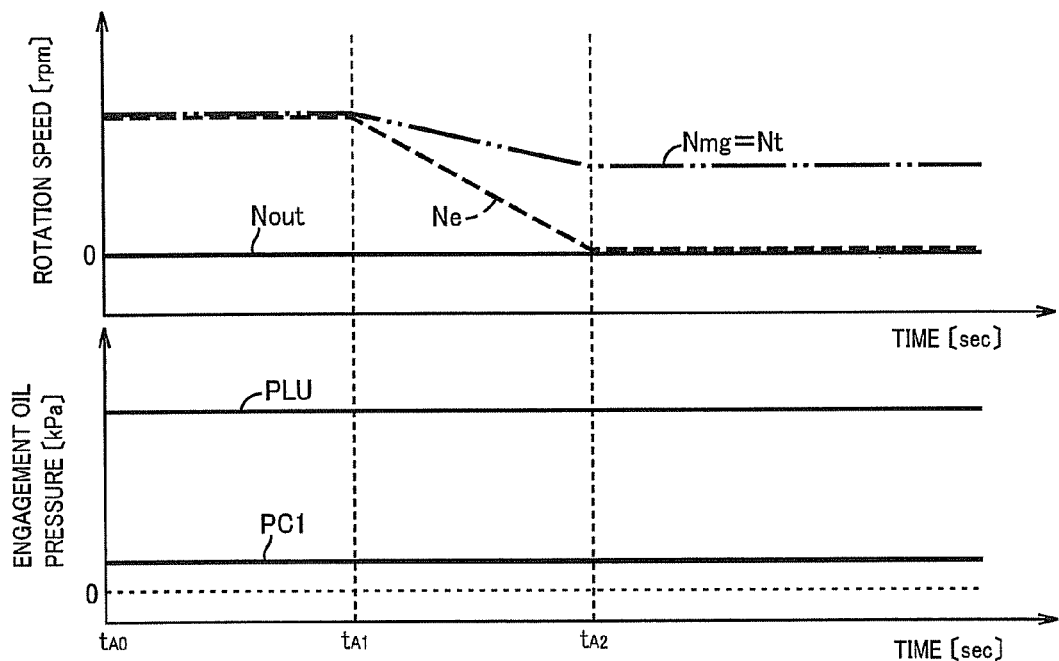
FIG. 4 is a time chart of an initial stage of control start of the lockup N-control executed by the electronic control device of FIG. 1.
Figure 5:
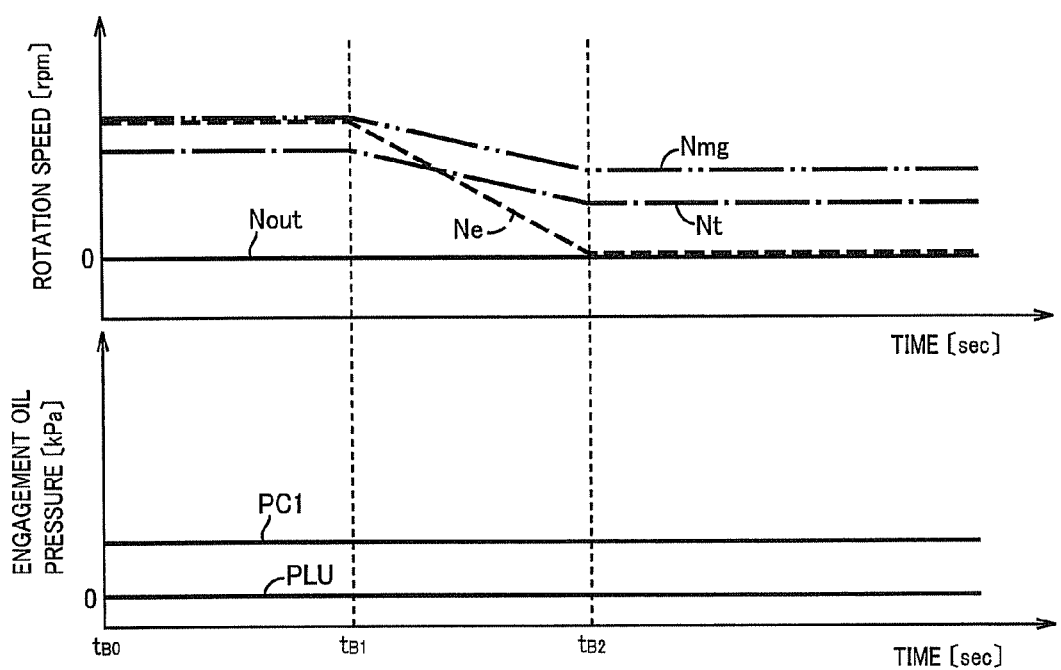
FIG. 5 is a time chart of an initial stage of control start of the lockup-off N-control executed by the electronic control device of FIG. 1.

FIG. 4 is a time chart of an initial stage of control start of the lockup N-control. FIG. 5 is a time chart of an initial stage of control start of the lockup-off N-control. In FIGS. 4 and 5, both an engagement oil pressure PLU of the lockup clutch LU and the engagement oil pressure PC1 of the starting clutch C1 are represented by the command value of the engagement oil pressure. Times $t_{A0}$, $t_{A1}$, and $t_{A2}$ of FIG. 4 correspond to times $t_{B0}$, $t_{B1}$, and $t_{B2}$, respectively, of FIG. 5. In FIGS. 4 and 5, in a range where a broken line indicative of the engine rotation speed Ne overlaps with a dashed-two dotted line indicative of the electric motor rotation speed Nmg or a solid line indicative of the output rotation speed Nout of the vehicle drive device 10, the broken line indicative of the engine rotation speed Ne is slightly shifted from the dashed-two dotted line or the solid line for enhanced visibility.

In FIG. 4, the vehicle speed V becomes zero before time $t_{A0}$ and the idling reduction executing condition is satisfied. Therefore, in FIG. 4, the output rotation speed Nout of the vehicle drive device 10 corresponding to the vehicle speed V is zero from beginning to end. Time $t_{A1}$ indicates a time point at which the engine rotation speed Ne starts decreasing from the idling rotation speed because of the release of the engine connecting/disconnecting clutch K0 and the stop of the operation of the engine 12 due to the idling reduction control. Time $t_{A2}$ indicates a time point at which the engine rotation speed Ne starting to decrease from time $t_{A1}$ reaches zero.

In FIG. 5, as is the case with FIG. 4, the vehicle speed V becomes zero before time $t_{B0}$ and the idling reduction executing condition is satisfied. Therefore, in FIG. 5, the output rotation speed Nout of the vehicle drive device 10 corresponding to the vehicle speed V is zero from beginning to end. Time $t_{B1}$ indicates a time point at which the engine rotation speed Ne starts decreasing from the idling rotation speed because of the release of the engine connecting/disconnecting clutch K0 and the stop of the operation of the engine 12 due to the idling reduction control. Time $t_{B2}$ indicates a time point at which the engine rotation speed Ne starting to decrease from time $t_{B1}$ reaches zero.

In FIG. 4, since the engine 12 is idling before time $t_{A1}$, the electric motor MG idly rotates or outputs auxiliary torque. From time $t_{A1}$, the mechanical oil pump 28 is driven by the electric motor MG instead of the engine 12. Therefore, in FIG. 4, the electric motor rotation speed Nmg does not become zero even after time $t_{42}$ and is maintained at a predetermined rotation speed for driving the mechanical oil pump 28. The electric motor rotation speed Nmg and an operation state of the engine 12 depicted in FIG. 5 are the same as FIG. 4. However, the engagement oil pressure PLU of the lockup clutch LU indicates a level of maintaining the engaged state of the lockup clutch LU in FIG. 4, while the engagement oil pressure PLU is zero in FIG. 5, and this fact reveals that the lockup clutch LU is engaged in FIG. 4 and is released in FIG. 5. Therefore, a slip of the torque converter 16 does not occur and the turbine rotation speed Nt is the same as the electric motor rotation speed Nmg in FIG. 4, while the turbine rotation speed Nt is lower than the electric motor rotation speed Nmg in FIG. 5 because a slip of the torque converter 16 occurs.

If the mechanical oil pump 28 is driven by the electric motor MG in the non-operating state of the engine 12, the rotation speed Nmop of the mechanical oil pump 28 is made lower as compared to during idling of the engine 12 and, therefore, the electric motor rotation speed Nmg after time $t_{42}$ is lower than the rotation speed before time $t_{41}$ in FIG. 4. This change in the electric motor rotation speed Nmg is the same in FIG. 5.

Since the lockup N-control is executed in FIG. 4 and the lockup-off N-control is executed in FIG. 5, the engagement oil pressure PC1 of the starting clutch C1 is set to a level of maintaining the slip state of the starting clutch C1 in both FIGS. 4 and 5. However, since the electric motor torque Tmg is amplified by the differential rotation DNpt of the torque converter 16 and transmitted to the transmission input shaft 19 in FIG. 5, the engagement oil pressure PC1 of the starting clutch C1 depicted in FIG. 5 is larger than that of FIG. 4. In other words, when executing the N-control with the lockup clutch LU released, the neutral control means 92 makes an engagement force of the slipped starting clutch C1 larger as compared to the case of executing the N-control with the lockup clutch LU engaged.

According to this example described above, if the mechanical oil pump 28 is driven by the electric motor MG while the operation of the engine 12 is stopped, i.e., if the operation of the engine 12 is stopped and the mechanical oil pump 28 is driven by the electric motor MG when the vehicle stops, the neutral control means 92 executes the neutral control (N-control) of putting the starting clutch C1 into a slip state to suppress the power transmission between the torque converter 16 and the drive wheels 24. Therefore, although the neutral control is executed only while the engine is operating in the conventional technique, since the neutral control is executed when the operation of the engine 12 is stopped, the electronic control device 58 can reduce a power loss due to a slip of the torque converter 16 as compared to the case that the turbine impeller 16t is bound to the drive wheels 24 because of the engagement of the starting clutch C1 during vehicle stop. As a result, deterioration in fuel efficiency of the vehicle 8 can be suppressed. Since a sufficient oil pressure can be acquired from the mechanical oil pump 28 while the engine 12 is not operating, for example, the electric oil pump can be eliminated or, even if the electric oil pump is included, the electric oil pump can be reduced in size. Since the starting clutch C1 is put into the slip state in the neutral control, responsiveness of the vehicle 8 is advantageously made higher at the restart from the vehicle stop as compared to the case of putting the starting clutch C1 into the released state. The vehicle stop performed in the neutral control is preferably a temporary stop.

According to this example, at SA6 of FIG. 3, the electronic control device 58 engages the lockup clutch LU during executing of the neutral control. Therefore, the pump impeller 16p and the turbine impeller 16t of the torque converter 16 are mechanically coupled to and integrally rotated with each other due to the engagement of the lockup clutch LU and, thus, the power loss of the torque converter 16 is suppressed as compared to the case of releasing the lockup clutch LU during executing of the neutral control. If the lockup clutch LU is engaged during executing of the neutral control, for example, the electronic control device 58 can perform a friction start, i.e., a vehicle start with the starting clutch C1 slipped, while retaining the engaged state of the lockup clutch LU at the restart from the vehicle stop.

According to this example, at SA8 of FIG. 3, the electronic control device 58 releases the lockup clutch LU during executing of the neutral control. In this case, when the engine is started during vehicle stop, the lockup clutch LU is preferably released so as to make it difficult to transmit a shock associated with the engine start to the drive wheels 24. Since the lockup clutch LU is already released at SA8, the electronic control device 58 does not have to perform the release operation of the lockup clutch LU before the engine start. Therefore, the electronic control device 58 can reduce a time required for the engine start as compared to the case that the lockup clutch LU is engaged during executing of the neutral control.

According to this example, if it is determined at SA4 of FIG. 3 that the warm-up of the power transmission device 32 needs to be promoted, the lockup-off N-control is executed at SA8. Since the lockup clutch LU is released in the lockup-off N-control, the operating oil in the torque converter 16, i.e., the operating oil of the power transmission device 32 is stirred by a slip of the torque converter 16 and this promotes the warm-up of the power transmission device 32. Therefore, if it is determined at SA4 that the warm-up of the power transmission device 32 needs to be promoted, in other words, it can be said that the warm-up of the power transmission device 32 is promoted during executing of the N-control. In particular, from the flowchart of FIG. 3, if the warm-up of the power transmission device 32 is promoted during executing of the N-control, the electronic control device 58 releases the lockup clutch LU at SA8. Since the lockup clutch LU is released at SA8 in this way, the operating oil (oil) is stirred in the torque converter 16 as described above, resulting in a prompt rise in the operating oil temperature TEMPatf, and the warm-up of the power transmission device 32 can promptly be completed.

According to this example, if it is determined at SA5 of FIG. 3 that the engine 12 is likely to be restarted after a stop of operation while the vehicle is kept stopped after vehicle stop, the lockup-off N-control is executed at SA8. In other words, the lockup clutch LU is released at SA8. Therefore, the electronic control device 58 can increase a frequency of a responsive start of the engine 12 when the engine is started while the vehicle is kept stopped.

According to this example, during executing of the N-control (the lockup-off N-control or the lockup N-control), the neutral control means 92 may gradually operate the engine connecting/disconnecting clutch K0 from the released state in the engagement direction and may detect the operation amount (initial operation amount) of the engine connecting/disconnecting clutch K0 when the reduction in the rotation speed occurs in the electric motor MG due to the operation of the engine connecting/disconnecting clutch K0. In this case, the electronic control device 58 can obtain an operation amount when the engine connecting/disconnecting clutch K0 starts having a torque capacity based on the reduction in the rotation speed of the electric motor MG. The operation amount of the engine connecting/disconnecting clutch K0 starting to have a torque capacity can be utilized in the control of operating the engine connecting/disconnecting clutch K0. For example, the operation amount can be utilized for operating the engine connecting/disconnecting clutch K0 with good responsiveness such that engagement shock is suppressed.

According to this example, during executing of the N-control (the lockup-off N-control or the lockup N-control), the neutral control means 92 may gradually operate the other engagement device Coth included in the automatic transmission 18 from the released state in the engagement direction and may detect the operation amount (initial operation amount) of the other engagement device Coth when the reduction in the rotation speed occurs in the electric motor MG due to the operation of the other engagement device Coth. In this case, the electronic control device 58 can obtain an operation amount when the other engagement device Coth starts having a torque capacity based on the reduction in the rotation speed of the electric motor MG. The operation amount of the other engagement device Coth starting to have a torque capacity can be utilized in the control of operating the other engagement device Coth. For example, the operation amount can be utilized for a shift of the automatic transmission 18 involving an engagement or release of the other engagement device Coth with good responsiveness and suppressed engagement shock.

According to this example, if the mechanical oil pump 28 is driven by the electric motor MG while the operation of the engine 12 is stopped, i.e., if the operation of the engine 12 is stopped and the mechanical oil pump 28 is driven by the electric motor MG, the drive force source control means 84 makes the rotation speed Nmop of the mechanical oil pump 28 lower as compared to during idling of the engine 12. Therefore, the electronic control device 58 can suppress an energy consumed for acquiring the oil pressure of the mechanical oil pump 28 lower as compared to during operation of the engine. The electric motor MG has favorable controllability as compared to the engine 12, for example, even at low speed rotation lower than the idling rotation speed of the engine 12 and, therefore, the mechanical oil pump 28 is driven at stable rotation speed.

Although the rotation speed Nmop of the mechanical oil pump 28 is the same as the idle rotation speed of the engine 12 if the engine connecting/disconnecting clutch K0 is engaged during idling of the engine 12 as can be seen from FIG. 1, according to this example, while the mechanical oil pump 28 is rotated by the electric motor MG the rotation speed Nmop of the mechanical oil pump 28 is lower than the rotation speed (idle rotation speed) of idling of the engine 12. Therefore, since the differential rotation DNpt of the torque converter 16 can be suppressed as compared to during idling of the engine 12 while a necessary discharge amount of the mechanical oil pump 28 is acquired, the fuel efficiency of the vehicle 8 is improved.

Although the example of the present invention has been described in detail with reference to the drawings, this is merely an embodiment and the present invention can be implemented in variously modified and improved forms based on the knowledge of those skilled in the art.

For example, although the vehicle 8 includes the mechanical oil pump 28 driven by the engine 12 or the electric motor MG and therefore does not include an electric oil pump in the example described above, the vehicle 8 may include a small-sized electric oil pump supplementarily used with the mechanical oil pump 28. Even if such a small-sized electric oil pump is disposed, the mechanical oil pump 28 must be driven for acquiring a sufficient oil pressure for the idling reduction control.

Although the starting clutch C1 is put into the slip state in the neutral control executed by the neutral control means 92 in the example, the starting clutch C1 may be put into the released state.

Although the engine connecting/disconnecting clutch K0 is released when the engine 12 is automatically stopped in the idling reduction control in the example, the idling reduction control may or may not include the release of the engine connecting/disconnecting clutch K0 performed along with the automatic stop of the engine 12.

Although the flowchart of FIG. 3 includes SA1 in the example, SA1 may not be included and the flowchart may be started from SA2.

Although the flowchart of FIG. 3 includes SA3 to SA5 in the example, all or a portion of SA3 to SA5 may not be included. If SA3 is not included, SA9 is unnecessary and SA10 is executed after SA8. If none of SA3 to SA5 are included, either SA6 or SA8 may be executed when the determination of SA2 is affirmative. In particular, although either the lockup-off N-control or the lockup N-control is alternatively executed depending on the determinations of SA3 to SA5 in the example, only one of the lockup-off N-control and the lockup N-control may be executed and the other N-control may never be executed. If the lockup N-control is not executed, the lockup clutch LU may not be provided.

Although the initial operation amount of the engine connecting/disconnecting clutch K0 and the initial operation amount of the other engagement device Coth are detected during executing of the lockup N-control at SA6 of the flowchart of FIG. 3 in the example, one or both of the initial operation amounts may not be detected.

Although the engagement force learning of the starting clutch C1 is performed during executing of the lockup-off N-control at SA8 of the flowchart of FIG. 3 in the example, the engagement force learning may not be executed.

Although it is determined whether the engine 12 is likely to be restarted after a stop of operation while the vehicle is kept stopped based on the charge remaining amount SOC of the electric storage device 57 or the inclination of the vehicle 8 corresponding to the road surface gradient in the example, the determination may be made based on another physical amount.

Although the vehicle drive device 10 includes the engine connecting/disconnecting clutch K0 in the example, the engine connecting/disconnecting clutch K0 may not be included and the engine output shaft 26 may always be coupled relatively non-rotatably to the rotor 30 of the electric motor MG. If the vehicle drive device 10 does not include the engine connecting/disconnecting clutch K0, when the electric motor MG drives the mechanical oil pump 28 during the idling reduction control, the engine 12 is dragged and rotated by the rotation of the electric motor MG.

Although the vehicle drive device 10 includes the starting clutch C1 as one constituent part of the automatic transmission 18 in the example, the vehicle drive device 10 may not include the automatic transmission 18 and may include the starting clutch C1 as a constituent part making up a portion of the power transmission path between the torque converter 16 and the drive wheels 24.

Although the automatic transmission 18 is a stepped automatic transmission in the example, the automatic transmission 18 may be an automatic transmission performing a clutch-to-clutch shift by changing gripped engagement elements or a CVT of a belt type etc. The Starting clutch C1 may be disposed separately from the automatic transmission 18.

Although the vehicle drive device 10 includes the automatic transmission 18 in the example, the automatic transmission 18 may be replaced with a manual transmission.

Although the torque converter 16 is used as a hydraulic power transmission device in the example, the torque converter 16 may be replaced with a fluid coupling without a torque amplification effect.

Although the starting clutch C1 is a hydraulic friction engagement device in the example, an operation mode of the starting clutch C1 is not particularly limited.

Although the neutral control is executed if the operation of the engine 12 is stopped and the mechanical oil pump 28 is driven by the electric motor MG when the vehicle stops in the example, whether the neutral control is executed in this way can be confirmed by various methods in a typical hybrid vehicle. For example, while the idling reduction control is executed, it may be confirmed that the mechanical oil pump 28 is driven by the electric motor MG and that the neutral control is executed in the automatic transmission 18.

NOMENCLATURE OF ELEMENTS

8: hybrid vehicle (vehicle) 10: vehicle drive device 12: engine 16: torque converter (hydraulic power transmission device) 18: automatic transmission (transmission) 24: drive wheels 28: mechanical oil pump 32: power transmission device 58: electronic control device (control device) C1: starting clutch (engagement device) Coth: another engagement device K0: engine connecting/disconnecting clutch LU: lockup clutch MG: electric motor

The invention claimed is:

1. A control device of a vehicle drive device comprising an engine and an electric motor acting as a drive force source for running, a mechanical oil pump driven by at least one of the engine and the electric motor, a hydraulic power transmission device transmitting power of the engine and the electric motor to drive wheels, and an engagement device interposed between the hydraulic power transmission device and the drive wheels, the engagement device transmitting power input from the hydraulic power transmission device to the drive wheels when engaged, while the electric motor drives the mechanical oil pump while an operation of the engine is stopped, the control device executing neutral control of putting the engagement device into a slip state or a released state to suppress power transmission between the hydraulic power transmission device and the drive wheels, the hydraulic power transmission device including a lockup clutch mechanically coupling input and output members of the hydraulic power transmission device when engaged, the lockup clutch being engaged during executing of the neutral control, and after the control device determines that the engine is likely to be restarted after a stop of operation while the vehicle is kept stopped, the lockup clutch being released.

2. The control device of the vehicle drive device of claim 1, wherein while warm-up of a power transmission device including the engagement device and the hydraulic power transmission device is promoted during executing of the neutral control, the lockup clutch is released.

3. The control device of the vehicle drive device of claim 1, wherein an engine connecting/disconnecting clutch is disposed that selectively interrupts power transmission between the engine and the electric motor and that is released when an engine operation is stopped, wherein during executing of the neutral control, the engine connecting/disconnecting clutch is operated from a released state in an engagement direction to detect an operation amount of the engine connecting/disconnecting clutch when reduction in rotation speed occurs in the electric motor due to the operation of the engine connecting/disconnecting clutch.

4. The control device of the vehicle drive device of claim 1, wherein a transmission is disposed that includes the engagement device and another engagement device to perform a shift between the hydraulic power transmission device and the drive wheels, wherein during executing of the neutral control, the another engagement device is operated from a released state in an engagement direction to detect an operation amount of the another engagement device when reduction in rotation speed occurs in the electric motor due to the operation of the other engagement device.

5. The control device of the vehicle drive device of claim 1, wherein while the mechanical oil pump is driven by the electric motor while an operation of the engine is stopped, a rotation speed of the mechanical oil pump is made lower as compared to a rotation speed of the engine during idling of the engine.

\* \* \* \* \*